(No Model.)
J. R. STEITZ.
SPRINKLER.
No. 480,048.  Patented Aug. 2, 1892.
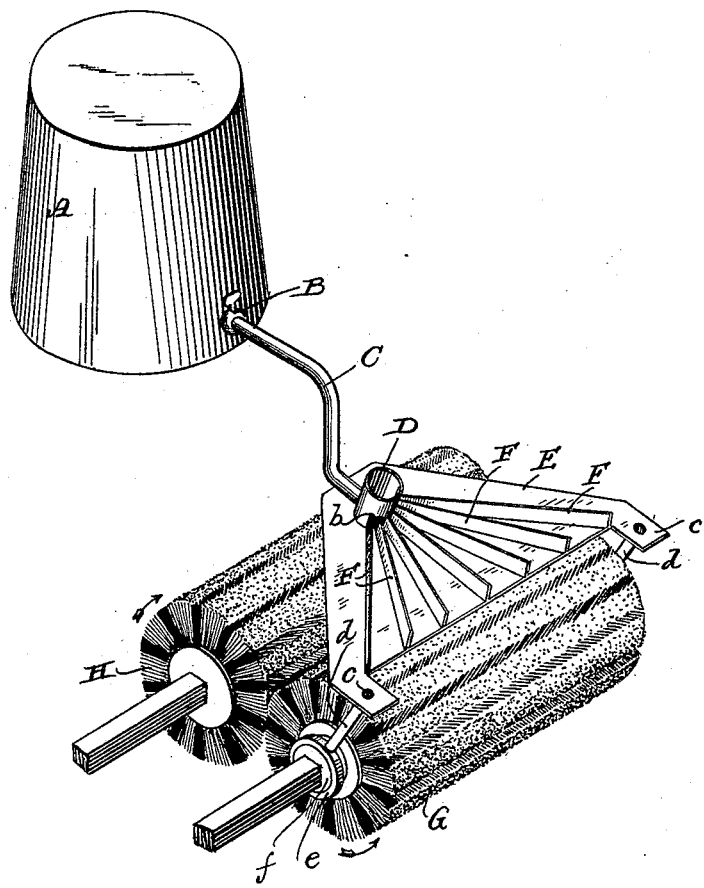

UNITED STATES PATENT OFFICE.

JACOB R. STEITZ, OF ST. FRANCIS, WISCONSIN.

SPRINKLER.

SPECIFICATION forming part of Letters Patent No. 480,048, dated August 2, 1892.

Application filed March 14, 1892. Serial No. 424,803. (No model.)

*To all whom it may concern:*

Be it known that I, JACOB R. STEITZ, a citizen of the United States, and a resident of St. Francis, in the county of Milwaukee, and in the State of Wisconsin, have invented certain new and useful Improvements in Sprinklers; and I do hereby declare that the following is a full, clear, and exact description thereof.

My invention embodies certain features shown and described in a previous application, No. 403,339, filed by me August 21, 1891, and has for its object to provide a sprinkler mechanism particularly designed for the economical distribution of poisonous fluid on growing plants; and the said invention consists in certain peculiarities of construction and combination of parts to be hereinafter described with reference to the accompanying drawing, and subsequently claimed.

The drawing represents a perspective view of the construction and relative arrangement of the parts constituting my improved sprinkler mechanism.

Referring by letter to the drawings, A represents a suitable receptacle for the fluid to be distributed, and fitted to the lower portion of this receptacle is a faucet B, connected by a tube C with a cup D on a shield E, said tube being flexible or otherwise, as may be found necessary or desirable. The cup D has a segmental slot *b* in its lower rear portion, and a series of plates F are set on edge upon the shield to radiate from the cup-slot, and thus form a series of channels; but the said shield may be otherwise channeled without departure from the spirit of my invention. The shield is cut away at its rear end to leave ears *c*, that are shown as connected to braces *d*, that extend up from rings *e*, surrounding bosses *f* on a circular brush G, that has its tufts in frictional contact with a similar brush H, and in practice these brushes are rotated simultaneously in opposite directions by any suitable mechanism. The fluid in the receptacle, being discharged onto the shield, will run down the channels of the latter onto the adjacent brush G throughout the whole length of the same, and this brush being revolved in a direction contrary to that of the one H said fluid is distributed in the form of spray and its heavy particles positively deposited on the plants over which the sprinkler mechanism may be traveled, it being understood that in practice this sprinkler mechanism is mounted on any suitable carriage, as is common in the art to which my invention relates.

In my previous application I showed the above-described distributing-shield in connection with a rotary brush working in opposition to a stationary brush, while in the present case both brushes are rotary, and as a movement other than rotary may be given to one or both brushes in order to effect a spraying of the fluid fed thereto I do not wish to be understood as confining myself to a construction that involves said distributing-shield in connection with a pair of spraying-brushes in which one or both are limited to a rotary movement against the other.

Having now fully described my invention, what I claim as new, and desire to secure by Letters Patent, is—

1. The combination of a suitable receptacle, a pair of rotary brushes in frictional contact, and a distributing-shield having a tubular connection with the receptacle and positioned to discharge onto one of the brushes, substantially as set forth.

2. The combination of a suitable receptacle, a pair of rotary brushes in frictional contact, and a radially-channeled shield having a tubular connection with the receptacle and positioned to discharge onto one of the brushes, substantially as set forth.

3. The combination of a suitable receptacle, a pair of rotary brushes in frictional contact, and a distributer having a tubular connection with the receptacle and positioned to discharge onto at least one of the brushes, substantially as set forth.

In testimony that I claim the foregoing I have hereunto set my hand, at Milwaukee, in the county of Milwaukee and State of Wisconsin, in the presence of two witnesses.

JACOB R. STEITZ.

Witnesses:
N. E. OLIPHANT,
GEO. W. YOUNG.